United States Patent [19]

Gagnon

[11] Patent Number: 6,049,835
[45] Date of Patent: Apr. 11, 2000

[54] SYSTEM FOR PROVIDING EASY ACCESS TO THE WORLD WIDE WEB UTILIZING A PUBLISHED LIST OF PRESELECTED INTERNET LOCATIONS TOGETHER WITH THEIR UNIQUE MULTI-DIGIT JUMP CODES

[75] Inventor: Eric F. Gagnon, Brooklyn, N.Y.

[73] Assignee: Internet Media Corporation, Brooklyn, N.Y.

[21] Appl. No.: 08/705,967

[22] Filed: Aug. 30, 1996

[51] Int. Cl.⁷ ...................................................... G06F 15/16
[52] U.S. Cl. .......................................... 709/245; 709/227
[58] Field of Search ................................... 348/27, 8, 13; 386/83; 709/218, 229, 219, 245, 227; 345/335; 707/3; 235/375

[56] References Cited

U.S. PATENT DOCUMENTS

| | | | |
|---|---|---|---|
| 4,706,121 | 11/1987 | Young | 348/27 |
| 5,526,127 | 6/1996 | Yonetani et al. | 386/83 |
| 5,572,643 | 11/1996 | Judson | 709/218 |
| 5,612,730 | 3/1997 | Lewis | 348/8 |
| 5,625,781 | 4/1997 | Cline et al. | 345/335 |
| 5,659,729 | 8/1997 | Nielsen | 707/3 |
| 5,694,163 | 12/1997 | Harrison | 348/13 |
| 5,708,780 | 1/1998 | Levergood et al. | 709/229 |
| 5,764,906 | 6/1998 | Edelstein et al. | 709/219 |
| 5,804,803 | 9/1998 | Cragun et al. | 235/375 |

*Primary Examiner*—Albert De Cady
*Assistant Examiner*—David Ton
*Attorney, Agent, or Firm*—Blank Rome Comisky & McCauley LLP

[57] ABSTRACT

A system for quickly and easily accessing preselected desired addresses or URLs on the Internet is disclosed in which a published list of Internet or World Wide Web sites together with their unique jump codes is utilized in connection with a corresponding specialized Web site which is accessed by a user using either a personal computer or a TV Internet Terminal and remote control, after which access a jump code corresponding to the preselected desired URL is entered by the user and software contained in the specialized Web site immediately and automatically accesses the desired Web site.

20 Claims, 1 Drawing Sheet

6,049,835

SYSTEM FOR PROVIDING EASY ACCESS TO THE WORLD WIDE WEB UTILIZING A PUBLISHED LIST OF PRESELECTED INTERNET LOCATIONS TOGETHER WITH THEIR UNIQUE MULTI-DIGIT JUMP CODES

BACKGROUND OF THE INVENTION

The present invention is directed to a system for providing users of the Internet with easy access to the World Wide Web. More particularly, the present invention is directed to providing a central location which World Wide Web users of the Internet can reach and can then instruct to provide them with ready access to a particular location on the World Wide Web portion of the Internet.

Use of the Internet, a worldwide network of more than 100,00 individual computer networks and over 50 million users, has been gaining in popularity in the last several years. At the present time, almost every large corporation, university, government, organization, and many businesses around the world are connected to and have access to the worldwide network known as the Internet. The Internet is a collection of individual computer networks which are connected to each other by means of high-speed telephone and satellite data links, and which are all connected by a public-domain communications software standard.

The Internet was developed in the late 1960s, when it was established by the United States Defense Department as a research project for use by defense contractors and universities. The purpose of the Internet at that time was to create a military computer network which could still function reliably if any parts of it were destroyed in a nuclear war. A series of standardized communications protocols for sending information around the computer network were developed in order to ensure against the inherent unreliability of telephone lines and exposed telephone switching stations.

For over 25 years, the Internet was used primarily as a research-oriented computer communications network for universities, defense contractors, governments, and organizations in science and academia. During those years, it grew slowly but steadily and its proven freely, available communications protocols were also adopted by the computer and telecommunications industries and by large corporations, who used the Internet for electronic mail communications between and among their companies. In 1992, the United States Government turned over operation of the Internet's high-speed data links to commercial communications networks. That transfer, as well as the concurrent explosion in the use of personal computers, local area networks, bulletin boards systems, and consumer-oriented online services, caused the Internet to grow tremendously. Because of the convergence of those events, a critical mass for acceptance of the Internet as a standard means for the worldwide connection of individual computer networks of all kinds and sizes was created.

One of the reasons for the explosive growth of the Internet, which is growing at an estimated rate of 15%–20% per month, is the widespread acceptance of the Internet as the standard for electronic mail. The Internet is also well known for its two other main features, its usenet newsgroups, which constitute thousands of on-line discussion groups covering a wide variety of business, personal, and technical subjects, and the latest Internet phenomenon, the World Wide Web.

The World Wide Web or Web, as it is more commonly known, is a standardized method of combining the display of graphics, text, video and audio clips, as well as other features, such as secure credit card transactions, into a standardized, graphical, friendly interface that is easy for anyone to use. That is in contrast to the use of the Internet for electronic mail, which primarily consists of rapid text-based communications among one or more individuals.

The Web was designed by a British scientist in 1991 as a way to let researchers easily swap images instead of just messages. The creation of the first point-and-click software for "browsing" the Web, known as Mosaic, by the University of Illinois, enabled ready access to the Web by non-technically skilled users. Then, commercial companies, such as Netscape Communications Corporation, developed more sophisticated Web browsers, such as Netscape's Navigator. Another Web browser is the recently introduced Explorer 3.0 from Microsoft Corporation. Web browsers are also provided by well-known major on-line computer services such as Compuserve, American On-line, Prodigy, MCI and Netcom. Recently, Microsoft's Windows 95 operating system was introduced, which also includes its own Web browser.

The standard protocols which define the Web work in combination with a Web browser which runs on personal computers and handles the chores of accessing and displaying graphics and texts, and playing back video and audio files found on the Web. In addition to providing Web access, Web browsers and the Web tie together all the Internet's other useful features that existed before the advent of the Web, such as the newsgroups, FTP text file access, access to the net's Gopher sites, and, of course, sending or receiving electronic mail.

The World Wide Web standards are essentially a text coding, or "mark-up" method, where selected elements in a text file, such as article headlines, subheads, images and important words highlighted in the body of a text file can, by the insertion of special, bracketed codes (called HTML or Hyper Text Mark-up Language codes), be turned into hot links that are easily and instantly accessible by anyone with a Web browser.

The World Wide Web is considered by many to be the true information superhighway. It lays the foundation for the use of the Internet as an entirely new broadcast medium, one which provides individuals, groups, and companies with unprecedented new opportunities for broadcast communication. For example, it is now fairly easy to create one's own Web site or address on the Web such that all users on the Internet can reach it The Web thus provides an outlet for anyone who desires to self-publish articles, graphics, video clips, and audio files over the net. Since any individual Web site can be freely accessed by anyone else with Web access, anyone who creates a Web site has a form for broadcasting their information, news, announcements, or creative works to an audience of millions. In addition, communication by Internet electronic mail can be established by any member of this audience with the author of a Web site, thus providing a new level of two-way communication to this new broadcast medium.

Because the Web provides several key benefits for Internet users, those benefits are encouraging the explosive growth of the Web and, ultimately, the acceptance of the Internet as the world's de facto computer communications medium.

First, using the Web, is simplicity itself. Compared to the confusing Unix based commands which were required to use the Internet just a few years ago, using a Web browser provides the user with the same friendly, graphical point-and-click access to all the Internet's features that the users have come to expect from any good stand-alone Windows commercial software product. Once a user has accessed the Web, any of the 100,000 or more Web sites and their linked articles, text articles, graphic images, video/audio clips, extensive software libraries, and communications features are easily accessible with a click of the user's mouse key. In addition, any good Web browser software also opens up the Web's multimedia potential by providing users with instant and automatic access to helper applications software that automatically plays video and sound clips. Such multimedia potential has become a big attraction on the Web.

Web browsers also have a bookmark or hot list feature, which allows the user to capture and save the location of any Web site that is visited, so that such sites can be readily reaccessed by clicking on it from the user's Web browser at any time.

Using the Web, users can get instant access to many types of information, entertainment, and inter-active resources which are now available on the Web. Because of the explosion of newly created Web sites, the user can get access to useful, practical information on an almost infinite variety of subjects. The Web also provides an instant connection to millions of other people on the Internet. The resources which may be found on the Web are almost limitless.

In order to understand the use and operation of the Web, it is believed that certain terms that will be used herein should be defined. A Web browser, as previously discussed, is a graphical, Windows-based software program which is used on a personal computer to access the Web. A Web site or Web page describes an individual's "place" on the Web containing a single Web-published feature. A Web site is basically a collection of files located under a directory somewhere on someone's computer connected to the Internet. A Web site may consist of one Web page or of many Web pages, and usually also includes onscreen graphics, pictures, texts and video and audio clips, or an archive of software that can be downloaded, stored and used freely on the visitor's own personal computer.

Frequently, Web pages utilize links or hot links, two terms which are used interchangeably, to describe words or groups of words which are highlighted on Web pages. When a visitor clicks on a link with his mouse, he is immediately linked to another Web site or location on the current Web site containing the information that is referred to by the link. Any single Web site may contain dozens, hundreds, or even thousands of hot links, both to other sections within the same site or to other Web sites located anywhere else in the world.

Some Web pages also include a links page or jump site which consists of lists of links to many other Web sites. These are often a Web site author's favorite sites or feature links to Web sites pertaining to a specific subject.

Every Web site has an exact address, or location on the Web. Such addresses are known as a Uniform Resource Locator or URL. URLs consist of a confusing string of subdirectories, files or executable commands, separated by slashes, which are extremely difficult to work with and which must be typed into the user's Web browser exactly as they appear, including the use of upper and lower-case letters, in order to go to a Web site. While clicking on hot links will get the user to a Web site without having to type in a URL or copying a URL from a text file (if it is located on the user's computer) and pasting it into the user's Web browser-screen can save the user from this arduous task, the use of URLs has become the bane of the use of the Web.

Another difficulty with accessing the 100,000 or more individual Web sites is that many of them do not offer any truly useful information or other benefits. In addition, there are many Web sites which consist of nothing more than lists of links to other Web sites, which often do nothing more than link the visitor to a Web site to other useless Web link pages. Skimming along such pages can be a frustrating and information starving experience, and one which should hopefully be avoided. Thus, while in general, the Web makes everything on the Internet easy to find and access, there is a need for a directory of the well-thought out and useful sites, coupled with a way to easily and quickly access such sites in order for users to get the most from their Web experience as well as experiencing the best the Web has to offer. More particularly, given the 100,000 plus Web sites that exist at that the present time, with many more being added every day, there is a need for a system which the Web user can use to access Web sites which contain a substantial amount of original information, graphics, or multi-media, provide useful advice, news or entertainment, and present the information in a well-thought out and professional manner. Most importantly, there is a great need to provide Web users with a system for accessing such Web pages in an easy to use, automatic, and efficient manner.

SUMMARY AND OBJECTS OF THE INVENTION

In light of the above-described drawbacks of accessing the World Wide Web, it is clear that there is still a need in the art for a system for quickly and easily accessing selected beneficial sites or addresses on the World Wide Web portion of the Internet.

Therefore, it is a primary object of the present invention to provide a system by which user's of the World Wide Web portion of the Internet can readily access preselected Web sites or Internet addresses, after they have gained access to the World Wide Web portion of the Internet. More particularly, it is an object of the present invention to provide a specialized Web site which can be used in conjunction with published jump codes to readily and automatically access other Web sites or Internet locations, without the user having to remember or input the URL of the desired Web site.

Even more particularly, it is an object of the present invention to provide a printed publication containing descriptions of selected Web sites or addresses together with jump codes therefor which can readily be used in conjunction with a specialized Web site which includes software which, upon recognizing the inputted jump code, quickly and automatically accesses the desired Web site.

It is a further object of the present invention to be able to use the system of the present invention with any one of personal computers connected to the Web, Television Internet Terminal devices, or any other electronic device which can be used for Internet access.

The system of the present invention utilizes a published list of preselected Web sites, which are selected according to predetermined criteria, such as content, usefulness, presentation, and authorship. Each of the selected Web sites is assigned a specific four-digit jump code. A user desiring to access one of the preselected Web sites first gains access to the World Wide Web, using a Web browser, by accessing a special Web site which contains software for receiving any of the published four-digit jump codes and, based upon the stored relationship of the URLs corresponding to the input jump code, directly accesses the Web site corresponding to the jump code inputted by the user.

In the case of so-called "set top" TV Internet Terminals, such as those soon to be available from Sony and Phillips, the user accesses the specialized Web site using the TV Internet Terminal and then enters the desired jump codes using a remote control which is similar to a standard television channel selector. In that manner, users with the TV Internet Terminal will be able to access the desired Web sites using their television, the TV Internet Terminal, and the remote control push buttons.

With these and other objects, advantages and features of the invention that may become hereinafter apparent, the nature of the invention may be more clearly understood by reference to the following detailed description of the invention, the appended claims and to the several drawings attached herein.

DETAILED DESCRIPTION OF THE PREFERRED EMBODIMENT

Figure 1:
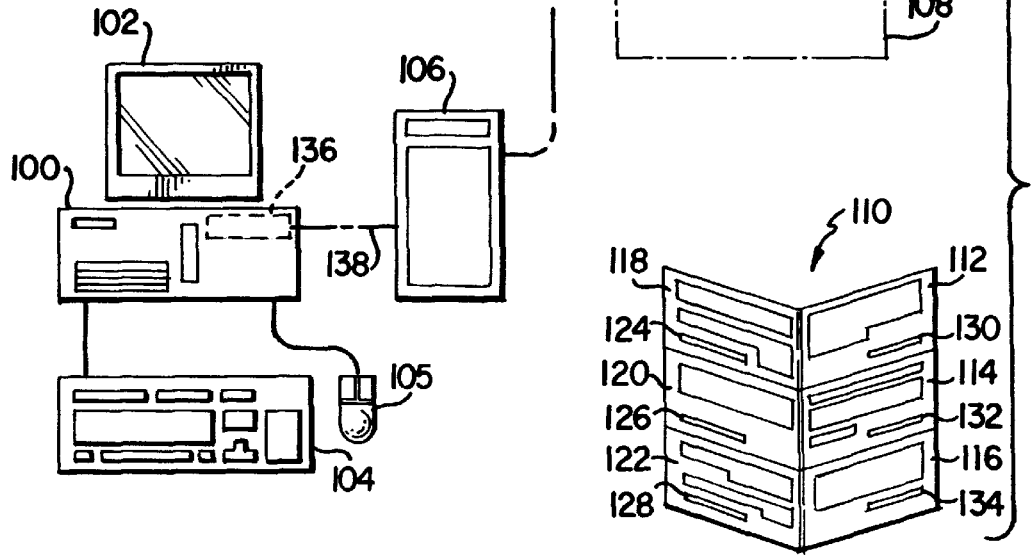
FIG. 1 shows, in schematic block diagram form, the inventive system of the present invention for use in connection with personal computer access to the Internet.

Referring now to the figures, wherein like reference numerals designate like elements throughout, there is shown in FIG. 1 the system of the present invention for use in connecting to the Internet by means of a personal computer. A personal computer 100, having a Web browser, is connected by means of a modem 136 by means of a telephone line or other communications medium, to a server computer 106 which provides access for the personal computer 100 directly to the Internet. The personal computer 100 includes a video monitor 102, as well as a keyboard 104 and a pointing device, such as a mouse or track ball, 105. Once the user has connected to the Internet, he accesses the specialized Web site 108, by entering the URL for that Web site. The specialized Web site is preferably a Web site called JumpCity, which has a URL of http://www.jumpcity.com/, although, obviously a specialized Web site for use as part of the inventive system disclosed herein could have any URL (and indeed would, of necessity, have to have its own URL), the only requirement being that the URL be disseminated in conjunction with the dissemination of the jump codes to be used therewith.

The JumpCity Web site 108 contains software which is capable of accepting a four-digit jump code, looking up the corresponding URL for the Web site denoted by that jump code in a stored data base, and then for immediately and automatically accessing that URL or Web site.

In order to provide Web users with the jump codes, it is preferable that a printed publication which contains preselected Web sites based on certain criteria be disseminated so that the jump codes associated with each of the preselected Web sites can be easily determined by the users. Such a publication, entitled "What's on the Web" published by Internet Media Corporation is one such type of book which is fully integrated with the specialized Web site 108. Such a book 110 contains a plurality of reviews of Web sites 112, 114, 116, 118, 120, and 122, each of which has a corresponding four digit jump code 124, 126, 128, 130, 132, and 134, associated therewith. After the user is on-line with the specialized JumpCity Web site 108, entering the four digit jump code will instantly link the Web site corresponding thereto to the JumpCity Web site, thus providing immediate access to the desired Web site for the user. There is no need to determine, nor input, the URL or address of the Web site which is desired to be accessed.

As discussed above, in addition to Web sites, any other type of subject matter contained on the Internet which has a URL, can be accessed using the jump code provided therefor. An example of such an additional use is the accessing of newsgroups, or Usenet Internet discussion newsgroups, where on-line discussions on thousands of subjects can be attained. Such newsgroups can also be accessed by means of the specialized JumpCity Web site 108. A listing of such newsgroups together with their assigned jump codes can be accomplished in a manner similar to that for the Web sites.

In addition to publishing a preselected number of descriptions and/or reviews of various Web sites 112–122 with their assigned jump codes 124–134 in a printed publication or book 110, the specialized JumpCity Web site 108 can also contain such reviews and their accompanying jump codes. In that matter, instant Web access to each of the reviews in the book 110, plus the latest news and reviews of the latest and best Web sites, updated, for example, daily, can be provided for users who access the specialized JumpCity Web site 108. In addition, without having to enter the URLs for accessing the preselected Web sites, users, after having access to the JumpCity Web site 108 and visiting other Web sites, can provide comments on the Web sites visited, vote on their favorite Web sites, and also participate in on-line discussions concerning those Web sites.

The preselected Web sites (over 1800 of which are covered in the "What's on the Web" book 110), are selected based upon four criteria. The first criteria is the content of the Web site. The selected Web sites preferably contain a substantial amount of original information, graphics and multimedia. The information contained in the selected Web sites is preferably comparable in value and amount to information that is available from traditional, professionally created media, such as newspapers and magazines. Also, it is preferable that the information available on the selected Web sites be updated on a reasonably frequent basis.

The second criteria is the usefulness of the information on the preselected Web sites. For example, it is preferable that the information available at the selected Web sites provide advice, news, and entertainment value. In addition, it is desirable that the information be useful to the Web reader to solve a problem.

The third criteria for selecting Web sites which are assigned jump codes is whether the site has good design and production values, that is, whether the graphics used by the site are interesting, professional-looking, and appropriate from the standpoint of Web design.

The fourth criteria used to preselect Web sites which are then assigned jump codes for use with the integrated specialized JumpCity Web site 108 and the Internet access system of the present invention is the authorship of the Web site. Preferably, the authors of the Web site are known and are highly knowledgeable concerning the information they are disseminating.

In order to use the Internet access system of the present invention, as discussed above, the user first must access the JumpCity specialized Web site 108 which is maintained for exclusive use in connection with the publication 110 which contains the preselected and reviewed Web sites 112–122 and their corresponding jump codes 124–134. The only URL the user need ever input in order to access any of the preselected (and best available) Web sites in the publication 110 is the URL of the JumpCity Web site 108. After the JumpCity Web site 108 has been accessed, the user enters the four-digit jump code (obviously a larger number of digits could be utilized in order to enable the accessing of a larger number of Web sites or newsgroups or other URL locations on the Internet) which corresponds to the selected Web site or newsgroup or other address the user desires to access. The code is entered in a standard on-screen HTML box or form which is then read by software resident on the JumpCity specialized Web site 108. This software program searches through its database of URLs, and finds the URL which is linked to the input jump code. The software then links the user either directly to the desired Web site, or alternatively, first to a brief written review of the Web site. By entering a simple four-digit code, the user is much more easily and conveniently able to access the desired Web sites, as compared to the standard method of accessing those Web sites, which requires the error-prone, tedious and confusing entry of URLs. The use of the jump codes printed in the printed publication or book 110 combined with the integrated specialized Web site 108 provides Web users with the fastest possible way of reaching the reviewed (and best) Web sites available on the World Wide Web portion of the Internet.

Figure 2:
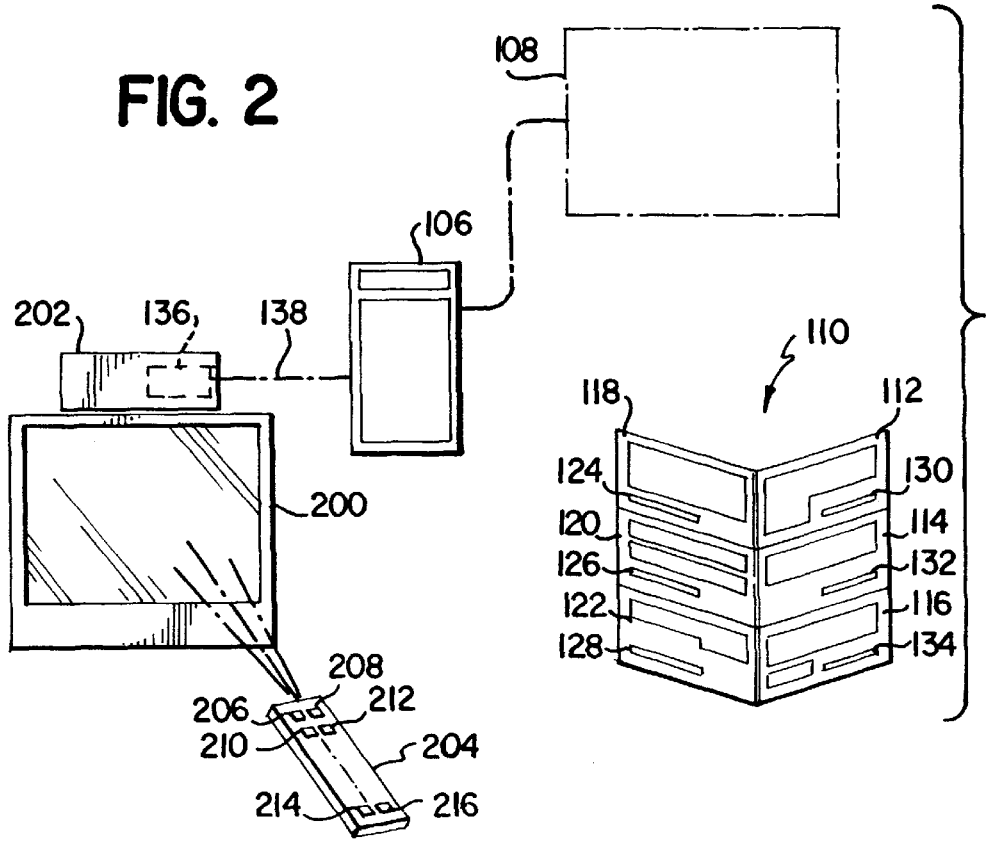
FIG. 2 shows the system of the present invention for use with television Internet terminal access to the Internet.

Referring now to FIG. 2, there is shown the system of the present invention for use with an alternative Internet access hardware and software. Specifically, a set-top TV Internet Terminal 202, such as that available from Sony or Philips, which uses software and hardware available from WebTV Networks, Inc., of Palo Alto, Calif., and known as a "Web TV Internet Terminal" is utilized, in connection with a standard broadcast television 200. The TV Internet Terminal 202 is connected to the television 200 such that the television functions in the same manner as the video monitor 102, that is, it displays the computer video generated by the TV Internet Terminal 202. The TV Internet Terminal 202, in addition to containing the necessary hardware and software for enabling the television 200 to display computer video, is connected by means of a modem 136 which may also preferably be a cable modem, through a telecommunications medium, such as a telephone line, cable system line 138 or other medium, such as by satellite, to the server 106 of the Internet access provider. From there the user is able to access the server on which the JumpCity Web site 108 resides, using the Internet.

The users of the TV Internet Terminal accessing hardware are likewise provided with a book 110 which contains the same information discussed above in connection with FIG. 1.

In order to access the selected Web sites contained and reviewed in the book 110, the users of the TV Internet Terminal are provided with a remote control device 204, which has an outward appearance similar to a standard television channel changer but which is designed to work in connection with the TV Internet Terminal 202. For that purpose, a plurality of specialized push buttons 206–216 are provided so that the TV Internet Terminal 202 can be commanded to access the Internet. In particular, in order to access the JumpCity Web site 108, one of the specialized buttons 206–216 may be a specialized function button which causes the TV Internet Terminal 202 to transmit the URL of the JumpCity Web site 108. Alternatively, the remote control 204 can contain enough push buttons to enable the user to enter the URL using the push buttons 206–216. After the user has accessed the JumpCity Web site 108, a jump code is entered followed by the depression of a specialized function key, similar to the enter key of the keyboard 104. In all other respects, accessing the desired Web site as published in the book or printed publication 110 or as published as an on-line list within the JumpCity Web site 108, is the same as described above in connection with FIG. 1. Obviously, the design of such a remote control 204 with specialized push buttons and function buttons as well as the TV Internet Terminal 202, will be known to those of ordinary skill in the art.

Although only a preferred embodiment is specifically illustrated and described herein, it will be appreciated that many modifications and variations of the present invention are possible in light of the above teachings and within the purview of the appended claims without departing from the spirit and intended scope of the invention.

What is claimed is:

1. A system for providing automatic access to preselected locations on the Internet, comprising:

a published compilation of preselected Internet locations, said published compilation including a unique predetermined multi-digit jump code assigned to each of said preselected Internet locations published therein;

a predetermined published Internet location having an address published in said published compilation, said predetermined published Internet location including means for capturing a desired multi-digit jump code assigned to each preselected Internet location after said multi-digit jump code has been entered by a user after accessing said predetermined published Internet location;

means for accessing said predetermined published Internet location;

means for receiving said desired multi-digit jump code from said means for capturing and means for converting said received multi-digit jump code to a URL address corresponding to the desired preselected Internet location; and means for automatically accessing said desired preselected Internet location using said URL address corresponding to said desired preselected Internet location, whereby said user need only enter said desired multi-digit jump code to access a desired preselected Internet location without having to enter said corresponding URL address.

2. The system of claim 1, wherein said means for accessing said preselected published Internet location comprises a personal computer.

3. The system of claim 1, wherein said means for accessing said preselected published Internet location comprises a television Internet device.

4. The system of claim 3, wherein said television Internet device comprises a remote control device having a plurality of push buttons for controlling said television Internet device.

5. The system of claim 1, wherein said preselected locations on the Internet are in the World Wide Web.

6. The system of claim 1, wherein said published compilation of preselected Internet locations is published as printed matter.

7. The system of claim 1, wherein said published compilation of preselected Internet locations is published on-line in said predetermined published Internet location on the Internet.

8. The system of claim 1, wherein said means for capturing a desired multi-digit jump code entered by a user after accessing said predetermined Internet location comprises an on-screen HTML form.

9. The system of claim 1, wherein said multi-digit jump code is a four digit number.

10. The system of claim 1, wherein said published compilation comprises a review of each of said preselected Internet locations.

11. A method for providing automatic access to preselected locations on the Internet, comprising the steps of:

publishing a compilation of preselected Internet locations, said published compilation including a unique predetermined multi-digit jump code assigned to each of said preselected Internet locations published therein;

providing a predetermined Internet location having an address published in said published compilation, said predetermined Internet location comprising means for capturing a desired multi-digit jump code assigned to said preselected Internet location, said desired multi-digit jump code being entered by a user after said predetermined Internet location has been accessed;

accessing said predetermined Internet location and entering said desired multi-digit jump code into said predetermined Internet location;

receiving said multi-digit jump code entered into said predetermined Internet location after said multi-digit jump code has been captured at said predetermined Internet location;

converting the received multi-digit jump code to a URL address corresponding to the desired preselected Internet location; and automatically accessing said desired preselected Internet location using said URL address corresponding to said desired preselected Internet location corresponding to said received multi-digit jump code.

12. The method of claim 11, wherein said step of accessing said predetermined Internet location comprises using a personal computer to enter said multi-digit jump code.

13. The method of claim 11, wherein said step of accessing said predetermined Internet location comprises using a television Internet device.

14. The system of claim 13, wherein said television Internet device comprises a remote control device having a plurality of push buttons for controlling said television Internet device.

15. The method of claim 11 wherein said preselected locations on the Internet are on the World Wide Web.

16. The method of claim 11, wherein said step of publishing a compilation of preselected Internet locations comprises publishing said compilation as printed matter.

17. The method of claim 11, wherein said step of publishing a compilation of preselected Internet locations comprises publishing said compilation on-line in said predetermined Internet location.

18. The method of claim 11, wherein said means for capturing a desired multi-digit jump code entered by a user after accessing said predetermined Internet location comprises an on-screen HTML form.

19. The method of claim 11, wherein said multi-digit jump code is a four digit number.

20. The method of claim 11, wherein said published compilation comprises a review of each of said preselected Internet locations.

\* \* \* \* \*